United States Patent [19]

Zinser

[11] Patent Number: 5,170,276
[45] Date of Patent: Dec. 8, 1992

[54] APPARATUS FOR IMAGING AN OBJECT

[75] Inventor: Gerhard Zinser, Speyer, Fed. Rep. of Germany

[73] Assignee: Heidelberg Engineering Optische Messsysteme GmbH, Heidelberg, Fed. Rep. of Germany

[21] Appl. No.: 830,420

[22] Filed: Feb. 4, 1992

[30] Foreign Application Priority Data

Feb. 4, 1991 [DE] Fed. Rep. of Germany ....... 4103298

[51] Int. Cl.$^5$ ............................................... G02B 26/10
[52] U.S. Cl. .................................... 359/202; 359/221; 250/234
[58] Field of Search ............... 359/201, 202, 205, 206, 359/207, 220, 221; 250/234, 235

[56] References Cited

U.S. PATENT DOCUMENTS

| 3,717,772 | 2/1973 | Engman | 359/202 |
| 4,714,830 | 12/1987 | Usui | 250/234 |
| 4,743,903 | 5/1988 | Morley | 359/202 |
| 4,788,423 | 11/1988 | Cline | 250/235 |

Primary Examiner—Loha Ben
Attorney, Agent, or Firm—Foley & Lardner

[57] ABSTRACT

An apparatus for imaging an object, particularly a three-dimensional object, (20) including a first and a second scanner (1, 2), each having a mirror (3, 4) in order to scan the object in two directions, especially orthogonal directions. The apparatus has a compact construction while still assuring optically perfect scanning in that the mirror (3) of the first scanner (1) is disposed a distance (7) from the axis of rotation of the first scanner, and the center or the pivot point of the second scanner (2) is disposed midway between the axis of rotation and the mirror (3) of the first scanner (1).

17 Claims, 1 Drawing Sheet

APPARATUS FOR IMAGING AN OBJECT

BACKGROUND OF THE INVENTION

The present invention relates to an apparatus for imaging an object, especially a three-dimensional object, comprising first and second scanners each associated with a respective mirror for scanning the object in two directions, particularly two orthogonal directions.

An apparatus of this type is disclosed in PCT Application No. WO 90/00025 and contains a light source which can be focused on the object to be imaged. The focus of the light beam can be moved three-dimensionally over the object by means of a scanning system, and the light reflected from the object at each point can be recorded by means of a detection system. Two scanners or beam deflecting elements are provided for scanning in two directions. An arrangement of at least two imaging optical elements is provided in the beam path between the two beam deflecting means. This arrangement of optical elements is adjustable in order to change the horizontal deflection angle. Such optical elements between the two beam deflecting elements require a considerable amount of space. Regardless of the particular configuration, additional optical elements of this kind are basically required for optically perfect scanning if the scanning is performed in two directions by means of two beam-deflecting elements. For convenience, such beam-deflecting elements will be referred to hereinafter as "scanners." For the sake of completeness it will be noted that bidirectional scanning might also be performed by means of a scanner that can be moved in two axes. This, however, cannot be done at high scanning speeds, if the rapid scanning is performed, for example, by a resonant scanner or a polygonal mirror.

U.S. Pat. No. 4,318,582 discloses an apparatus for bidimensional scanning comprising a first polygonal mirror. The light which strikes and is reflected by the first polygonal mirror passes through a lens system to a second mirror, which is likewise rotatable or can turn about an axis perpendicular to the axis of rotation of the polygonal mirror. The light rays are reflected by this second mirror onto an object and reflected again by the object. The object is disposed in a plane which is orthogonal to the axis of the first polygonal mirror, and the axis of the second mirror is aligned substantially parallel to the plane. The two mirrors are synchronized by means of appropriate processors and control systems in order to scan the planar object line by line in two mutually perpendicular directions. Since the two centers of rotation of the scanning movements in the two directions are spatially separated from one another, a light beam reflected by the first mirror will not always strike the second mirror at precisely the same point. Therefore a lens system is needed between the two rotating mirrors, which images the first mirror on the second mirror, in order to reduce the movement of the light beam on the second mirror. Aside from the fact that the lens system increases the manufacturing cost and the size of the system, the lens system itself leads to imaging errors. The scanning system must be comparatively large in size, especially when the scanning angles are relatively large.

Finally, DDR Patent No. DD 266,654 discloses an optical scanning system which has two mirrors which cooperate upon the illumination of an object or when light rays reflected or emitted by the object are detected. One of these mirrors is positioned near the pupil of the apparatus. The other mirror is disposed at a point for aiming the light at the first mirror or at a point for receiving light which is reflected or emitted from the first mirror. This system can be configured as a scanning apparatus in which the first mirror rotates about an axis perpendicular to the axis of symmetry of the apparatus. The axis of the second mirror is perpendicular to that of the first mirror, the distance between the intersecting axes being of the same magnitude as the average distance between the centers of the two mirrors. No optical lens system is provided between the two mirrors, yet the movement of the light beams on the two mirrors requires a corresponding enlargement of the mirror. Above all, relatively large movements of the light beam on the first mirror cause disadvantageous imaging errors. The errors caused by the movement of the light beam on the mirrors adversely affect the scanning process, inasmuch as they increase with increasing movement and scanning angles.

There remains a need for an optical scanning apparatus which overcomes the foregoing disadvantages.

SUMMARY OF THE INVENTION

It is therefore the object of the invention to provide an improved optical scanning apparatus.

Another object of the invention is to provide an optical scanning apparatus which assures optically perfect scanning in a compact design.

A further object of the invention is to provide a bidimensional scanning system which avoids optical imaging errors without requiring any optical imaging with lenses between the two scanning mirrors.

It is also an object of the invention to provide an optical scanning apparatus which has a simple and reliable design and yet permits high scanning speeds.

Another object of the invention is to provide an optical scanner which operates through the use of resonant scanners and polygonal mirrors.

These and other objects of the invention are achieved by providing an apparatus for imaging an object, the apparatus comprising first and second scanners each having an axis of rotation for scanning the object in two directions, a first mirror associated with the first scanner, and a second mirror associated with the second scanner, in which the mirror of the first scanner is disposed a distance from the axis of rotation of the first scanner, and the axis of rotation of the second scanner and the center of the second mirror are disposed midway between the axis of rotation of the first scanner and the center of the first mirror.

The apparatus according to the invention is characterized by compact construction and assures optically perfect scanning. Two scanners are used, such that the mirror of the first scanner is disposed a predetermined distance from the axis of rotation of the first scanner, and the pivot point and/or the center of the mirror of the second scanner is positioned midway between the axis of rotation of the first scanner and the mirror of the first scanner. A confocal laser scanning system is created, in which the first mirror is disposed at a distance transversely of the axis of rotation of the first scanner. The first mirror is advantageously disposed substantially parallel to the axis of rotation of the first scanner, and the rays emitted by a beam source, particularly by a laser, strike the first mirror in an area in the vicinity of the center of the mirror. This area depends on the magnitude of the deflection or inclination of the first mirror. A light deflecting element, such as a semi-transparent mirror, is disposed between the beam source and the first mirror in order to feed the rays reflected from the object to the first mirror via the second mirror to an evaluator or processing apparatus. The rays reflected by the second mirror onto the first mirror likewise arrive at the area surrounding the center of the first mirror. In a corresponding manner, the second mirror is arranged such that the rays strike and are reflected from an area near the center. The object is scanned in one direction in accordance with the deflection of the first mirror, and it is scanned in a second direction in accordance with the deflection of the second mirror. The mirrors and their axes of rotation are arranged in such a way that the scanning directions advantageously are substantially orthogonal to one another. However, it is also within the scope of the invention for the scanning directions to assume angular orientations which deviate from this. The axes of rotation of the two scanners extend in planes which are substantially orthogonal to one another. The axes of rotation are substantially orthogonal to one another but do not intersect each other. The axis of rotation of the second scanner extends substantially through the center of the second mirror, with the plane of the mirror being disposed substantially parallel to this axis of rotation. If desired, the first and the second mirrors can be disposed in planes which are inclined at a small angle with respect to the axis of rotation of the respective scanner, in order to provide for other than orthogonal scanning directions to be applied to the object. Due to the parallel alignment of the mirrors with respect to the associated axes of rotation, as well as the orthogonal orientation of the axes of rotation to each other, scanning of the object advantageously takes place in two orthogonal directions.

The first mirror of the first scanner is disposed offset from the axis of rotation, while the center of the mirror of the second scanner is positioned centrally between the axis of rotation of the first scanner and the mirror of the first scanner. Due to the arrangement of the invention, the movements of the light beam on the first mirror relative to the center of the mirror, as well as the movement of the light beam on the second mirror relative to the center of the mirror, are reduced to a minimum. The mirrors therefore can have very small dimensions, and the errors caused by the movement of the beams on the mirrors during the scanning are kept very small without any intermediate optical imaging. Due to this special arrangement, the intermediate optical imaging described above is unnecessary, and the structural volume of the apparatus can be substantially reduced compared to previously known apparatus. The cost of the apparatus is reduced to a minimum, and it is not necessary to mechanically couple the two scanners.

In the confocal scanning system according to the invention, the focal plane of the scanning process in regard to the object is displaceable, especially in the latter, so that overall a three-dimensional scanning can be performed. The beam source, particularly a laser source, can be focused on the object that is to be imaged, whereby the scanning movement is imaged in the entrance pupil which is associated with the object and, for example, a lens. Due to the arrangement according to the invention, the rays strike the respective centers of the two mirrors, substantially independently of the scanning angles. The sharp imaging of the object that is thereby achieved results in a high signal density.

In one preferred embodiment, a scanning unit for the third direction is constructed in such a way that the imaging lenses are disposed in a fixed position and the rest of the scanning system is shifted. In this manner the focal plane of the scanning procedure can be shifted in the object. In this special embodiment the intermediate image plane is shifted. Without additional optical elements, an optically perfect ray path is achieved even in the out-of-focus state.

The apparatus according to the invention contains a beam source which can be focused onto the object to be imaged, a scanning system by means of which the focus of the light beam can be guided in three dimensions over the object, plus the detection system which records the light reflected at each point by the object. The confocal construction assures a high optical resolution even parallel to the optical axis. By means of the two mirrors or double scanners the scanning is performed in the two substantially orthogonal directions. For the third scanning plane referred to above, provisions are made for displacing the intermediate image plane.

In one special embodiment the apparatus according to the invention is used for measuring distances. Use is made of the fact that a high signal density is achieved because of the sharp imaging of the object in accordance with the invention. In front of or behind the object the signal density is substantially lower. The distance to the object is computed from the optical data of the system in conjunction with the focal distance. This apparatus has a compact construction and reliably enables distances to be measured, whereby the maximum signal density of the imaged object registered in the processing system, being computed as the criterion for calculating the distance based on the set focal distance.

Additional preferred features and advantages will become apparent from a consideration of the following description of preferred embodiments.

BRIEF DESCRIPTION OF THE DRAWINGS

The invention will be described in further detail with reference to the accompanying drawing figures in which.

DETAILED DESCRIPTION OF PREFERRED EMBODIMENTS

Figure 1:
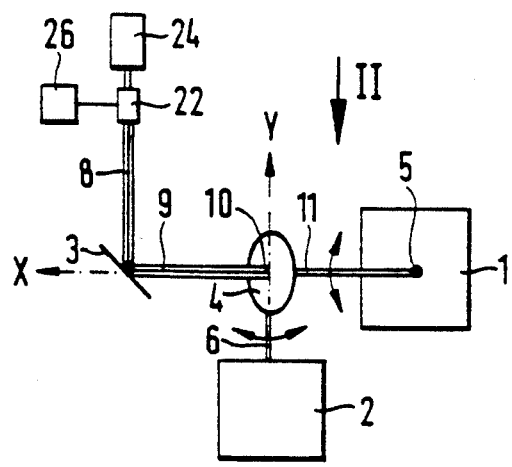
FIG. 1 is a diagrammatic representation of the apparatus of the invention.

FIG. 1 is a schematic diagram of a first scanner 1 and a second scanner 2. A first mirror 3 is mechanically coupled with the first scanner 1 and is arranged to turn on an axis 5 perpendicular to the plane of drawing. A second mirror 4, which can turn about an axis 6 parallel to the plane of drawing, is associated with the second scanner 2. The axes 5 and 6 extend in planes orthogonal to one another and are perpendicular to one another. It is important that the first mirror 3 is spaced a distance 7 from the first scanner 1, and that the axis of rotation 6 of scanner 2 extends centrally between the axis of rotation 5 of scanner 1 and mirror 3. In accordance with the invention, the center of the second mirror 4 is arranged halfway between the center of the first mirror 3 and the axis of rotation 5 of the first scanner 1. The axis of rotation 5 of the first scanner 1 is substantially parallel to the plane of the first mirror 3, although there is a space 7 between the center of the first mirror 3 and the axis of rotation 5. Also the axis of rotation 6 of the second scanner 2 extends substantially parallel to the second mirror 4. The axis of rotation 6 furthermore extends substantially through the center of the second mirror 4, although if desired, it can be offset therefrom. What is essential is that the center of the second mirror be disposed at half the distance 7 from the axis of rotation 5 to the first mirror 3. There are no lenses or optical imaging means between the two mirrors 3 and 4, and within the apparatus the rays 9 thus pass directly from the one mirror to the other. Rays 8 are indicated schematically, and run to and from a device 22 for decoupling the rays. The rays from a radiation source 24, preferably a laser, initially enter this device and from there they go to the apparatus of the invention and then on to the object. The rays reflected by the object again pass through the apparatus according to the invention and from there to the decoupling device 22 which then transmits them to a processing unit or detector 26 for further processing. The rays 10 beamed to the object and reflected by the object are oriented substantially orthogonal to the plane in which beams 8 and 9 extend.

Assume that an orthogonal axis system lies with its point of origin in the center of the second mirror 4, with the X-Y plane coinciding with the plane of drawing. The rays 8 extend parallel to the Y axis (direction Y), while the rays 9 between the two mirrors 3 and 4 extend in the direction of the X axis. The axis of rotation 6 of the second scanner 2 lies in direction Y, while axis of rotation 5 is orthogonal to the X-Y plane.

Figure 2:
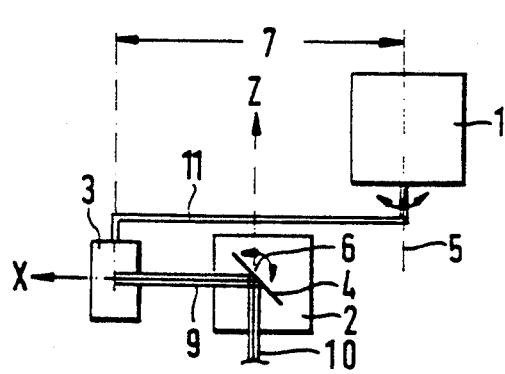
FIG. 2 is a diagrammatic representation of the apparatus of FIG. 1 as viewed in the direction of arrow II.

FIG. 2 shows a view of the apparatus of FIG. 1 viewed in the direction of the arrow II, with axis 5 extending in the plane of drawing and axis 6 extending perpendicular to the plane of the drawing. The first mirror 3 is connected to the first scanner 1 by an arm 11 and thus is spaced a distance 7 from the axis of rotation 5. The plane of the drawing corresponds to the X-Z plane of the aforedescribed coordinate system with its origin in the center of the second mirror 4. The rays 10 reflected by the second mirror 4 or returned by the object to the mirror 4 run extend in direction Z. The axis of rotation or pivot point of the second mirror 4 and of the second scanner 2 lies in the center between the axis of rotation 5 of scanner 1 and the pivot point of mirror 3. FIG. 2 also shows the rays 10 which are sent out from mirror 4 to the object and reflected again. The rays 8 transmitted from the decoupling device 22 to mirror 3 of first scanner 1 and reflected thereby extend orthogonally forward in front of the plane of the drawing.

Figure 3:
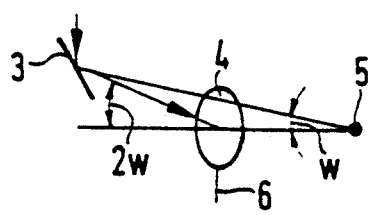
FIG. 3 is an illustration explaining the manner of operation.

The fundamentals of the operation of the apparatus illustrated in FIG. 1 will be explained with reference to FIG. 3. If the scanner 1 is deflected or turned by an angle w, the light beam falls on the pivot point of the mirror 4 of the second scanner 2 at the angle 2w due to the arrangement of the light beam according to the invention. This is true of comparatively small angles w on the order of from a few (i.e. 1 or 2) degrees of angle up to a maximum of 5 or 10 degrees of angle. The point at which beam 9 strikes mirror 4 should normally be the center the mirror and should be independent of the scanning angle w.

In the apparatus of the invention, the point of impingement varies along the scanning axis with the angle w by a magnitude g according to the following equation:

$$g = \frac{s}{2} + w^2(1 - w)$$

The parameter s corresponds to the distance 7. In a preferred embodiment of the invention, the distance 7 or parameter s is approximately 20 mm, and for a scanning angle $w = \pm 5°$, there results a very small change from 0 to 0.08 mm. Due to the arrangement according to the invention of the second mirror 4 in the center between the first scanner 1 and the mirror 3, both scanning movements have the same pivot point, namely the pivot point of the second mirror 4 of the second scanner 2. In this case neither intermediate optical imaging nor mechanical coupling of the two scanners is necessary.

Figure 4:
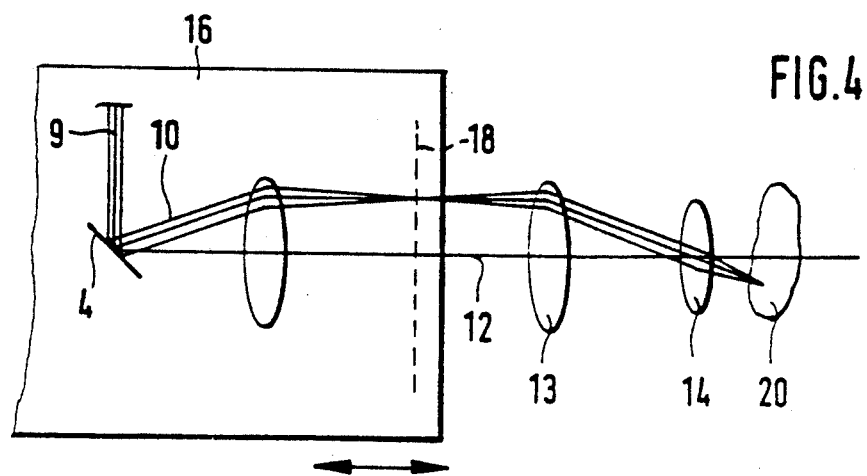
FIG. 4 is a diagrammatic representation of the shifting of the focal plane in the object.

A special embodiment of the invention, namely one for scanning in the third direction, which will be referred to as direction z, will be described with reference to FIG. 4. First let it be noted that in order to shift the focal plane of the scan in the object, on the one hand the distance between the scanning system and the object can be varied, especially by moving the object under the lens of the scanning system, or on the other hand the divergence of the scanning beam can be varied. If the distance between the last lens and the object is not varied, as is the case, for example, in the study of the rear section of the eye, the divergence of the scanning beam can be varied. This is usually done by using an additional lens system or by shifting one of the two lenses which image the pivot point of the scanning movement in the entrance pupil of the system of lens 14 and object 20. An additional lens system requires additional optical elements and a corresponding amount of space, while the shifting of the imaging lens leads to imaging errors, since the pivot points of the scanning process, i.e. the scanning pupils, are shifted.

In accordance with the inventive embodiment, the last two lenses 13 and 14 are held in fixed position with respect to each other and to the object 20, and the rest of the scanning system 16 is shifted in the third direction along the axis 12. The lenses 13 and 14 image the pivot point of the scanning movement in the entrance pupil of the system composed of lens 14 and object 20. In this manner the intermediate image plane 18 is shifted, and even in the out-of-focus state an optically perfect ray path is assured without additional elements. The spacing between the lenses 13 and 14 as well as to the object 20 remains unchanged. For the sake of simplicity only the second mirror 4 of the scanning system described above is illustrated, and it is to be noted that due to the compact construction of the scanning system, shifting of the scanning system, and thereby the proposed combination with regard to the fixed positioning of the last two lenses and of the object, are facilitated in an especially advantageous manner.

The foregoing description and examples have been set forth merely to illustrate the invention and are not intended to be limiting. Since modifications of the described embodiments incorporating the spirit and substance of the invention may occur to persons skilled in the art, the scope of the invention should be construed to include all variations falling within the ambit of the appended claims and equivalents thereof.

What is claimed is:

1. An apparatus for imaging an object, said apparatus comprising first and second scanners (1,2) each having an axis of rotation (5, 6) for scanning said object (20) in two directions, a first mirror (3) associated with said first scanner, and a second mirror (4) associated with said second scanner (2), wherein the mirror (3) of said first scanner (1) is disposed a distance (7) from the axis of rotation (5) of said first scanner, and the axis of rotation (6) of the second scanner (2) and the center of said second mirror (4) are disposed midway between said axis of rotation (5) of said first scanner (1) and the center of said first mirror (3).

2. An apparatus according to claim 1, wherein said object to be scanned is a three-dimensional object.

3. An apparatus according to claim 1, wherein said object is scanned in two orthogonal directions.

4. An apparatus according to claim 1, wherein light rays (9) are reflected directly from said first mirror (3) to said second mirror (4) without passing through other optical elements.

5. An apparatus according to claim 1, wherein said first mirror (3) is deflected only through an angle of from 1 to 10 degrees.

6. An apparatus according to claim 1, wherein said first mirror (3) is deflected only through an angle of from 1 to 5 degrees.

7. An apparatus according to claim 1, wherein said first mirror (3) is coupled to said first scanner by an arm (11) having a length substantially equal to the distance (7) between said axis of rotation (5) of said first scanner and said first mirror (3).

8. An apparatus according to claim 1, wherein light rays (8) from a ray decoupling system incident on the mirror (3) of said first scanner (1) are oriented substantially perpendicular to light rays (10) which are directed to or from said object (20) to be scanned.

9. An apparatus according to claim 1, which comprises a scanning system (16) with two final lenses (13, 14) held in fixed positions with respect to one another and to the object (20) to be scanned, and wherein the focal plane of scanning is shifted by shifting the remainder of said scanning system except for said two final lenses.

10. An apparatus according to claim 1, wherein rays emitted by a ray source (24) are transmitted through a partially light-transmitting deflecting device (22) to the center of said first mirror (3), and rays reflected by said first mirror (3) are conveyed through said partially light-transmitting deflecting device (22) to a processing system (26).

11. An apparatus according to claim 10, wherein said ray source is a laser.

12. An apparatus according to claim 1, wherein the axis of rotation (5) of said first scanner (1) is arranged substantially parallel to the plane of the first mirror (3).

13. An apparatus according to claim 1, wherein the axis of rotation (6) of said second scanner (2) is arranged substantially parallel to the plane of the second mirror (4).

14. An apparatus according to claim 1, wherein the axis of rotation (5) of said first scanner (1) is arranged substantially parallel to the plane of said first mirror (3), and the axis of rotation (6) of said second scanner (2) is arranged substantially parallel to the plane of said second mirror (4).

15. An apparatus according to claim 1, wherein the axes of rotation (5, 6) of said first and second scanners are arranged in planes orthogonal to one another.

16. An apparatus according to claim 1, wherein said axes of rotation of said first and second scanners are oriented orthogonally to one another.

17. An apparatus according to claim 1, wherein the axis of rotation (6) of said second scanner intersects substantially the center of said second mirror (4).

* * * * *